US007622712B2

(12) United States Patent
Hager

(10) Patent No.: US 7,622,712 B2
(45) Date of Patent: Nov. 24, 2009

(54) METHOD FOR OPERATING AN ION TRAP MASS SPECTROMETER SYSTEM

(75) Inventor: James Hager, Mississauga (CA)

(73) Assignees: MDS Analytical Technologies, Concord (CA); Applied Biosystems Inc., Framingham, MA (US)

( * ) Notice: Subject to any disclaimer, the term of this patent is extended or adjusted under 35 U.S.C. 154(b) by 100 days.

(21) Appl. No.: 12/034,097

(22) Filed: Feb. 20, 2008

(65) Prior Publication Data

US 2008/0230691 A1 Sep. 25, 2008

Related U.S. Application Data

(60) Provisional application No. 60/896,620, filed on Mar. 23, 2007.

(51) Int. Cl.
*H01J 49/42* (2006.01)
*H01J 49/00* (2006.01)
*B01D 59/44* (2006.01)

(52) U.S. Cl. ....................... 250/283; 250/292; 250/281; 250/282; 250/290; 250/293

(58) Field of Classification Search ................. 250/283, 250/292, 282, 281, 290, 293
See application file for complete search history.

(56) References Cited

U.S. PATENT DOCUMENTS 6,815,673 B2 * 11/2004 Plomley et al. ............. 250/292
6,909,089 B2 * 6/2005 Londry et al. ............... 250/282
7,049,580 B2 * 5/2006 Londry et al. ............... 250/282
7,227,137 B2 * 6/2007 Londry et al. ............... 250/292
2003/0189168 A1 * 10/2003 Londry et al. ............... 250/282
2004/0094702 A1 5/2004 Clemmer
2005/0242279 A1 11/2005 Vrentchikov

OTHER PUBLICATIONS

"Mass Spectrometry-based proteomics" Ruedi Aebersold et al, Nature, vol. 422, Mar. 13, 2003, pp. 198-207. Fig. 2 b-c and related description.

International Search Report and Written Opinion, PCT/CA2008/000317, mailed May 27, 2008.

* cited by examiner

*Primary Examiner*—Nikita Wells
(74) *Attorney, Agent, or Firm*—Bereskin & Parr LLP/S.E.N.C.R.L., s.r.l.

(57) ABSTRACT

A method of operating a mass spectrometer system having an ion trap is provided. The method comprises encoding a selected characteristic in at least one of the first group of precursor ions and the first plurality of fragments, wherein the encoding operation is applied to at least one of the first group of precursor ions and the first plurality of fragments without being applied to other ions such that the first plurality of fragment ions has the first selected characteristic and the other ions lack the first selected characteristic.

23 Claims, 5 Drawing Sheets

METHOD FOR OPERATING AN ION TRAP MASS SPECTROMETER SYSTEM

This is a non-provisional application of U.S. application No. 60/896,620 filed Mar. 23, 2007. The contents of U.S. application No. 60/896,620 are incorporated herein by reference.

FIELD

This invention relates to a method for operating an ion trap mass spectrometer system.

INTRODUCTION

Analysis of complex mixtures using an ion trap mass spectrometer typically involves mass resolution of a target precursor ion, generation of fragment ions, and conducting a mass scan of these fragment ions. There is a continuing need to improve the efficiency and accuracy of the analysis of complex mixtures.

SUMMARY

In accordance with an aspect of an embodiment of the invention, there is provided a method of operating a mass spectrometer system having an ion trap. The method comprises: a) processing a first group of precursor ions to obtain a first plurality of fragment ions trapped in the ion trap; b) applying a first encoding operation for encoding a first selected characteristic in at least one of the first group of precursor ions and the first plurality of fragments, wherein the first encoding operation is applied to the at least one of the first group of precursor ions and the first plurality of fragments without being applied to other ions such that the first plurality of fragment ions has the first selected characteristic and the other ions lack the first selected characteristic; c) ejecting the first plurality of fragment ions and the other ions out of the ion trap; d) detecting the first plurality of fragment ions and the other ions; e) based on the first selected characteristic, correlating the first plurality of fragment ions detected with the first group of precursor ions to distinguish the first plurality of fragment ions from the other ions detected.

These and other features of the applicant's teachings are set forth herein

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION OF THE INVENTION

Figure 1:
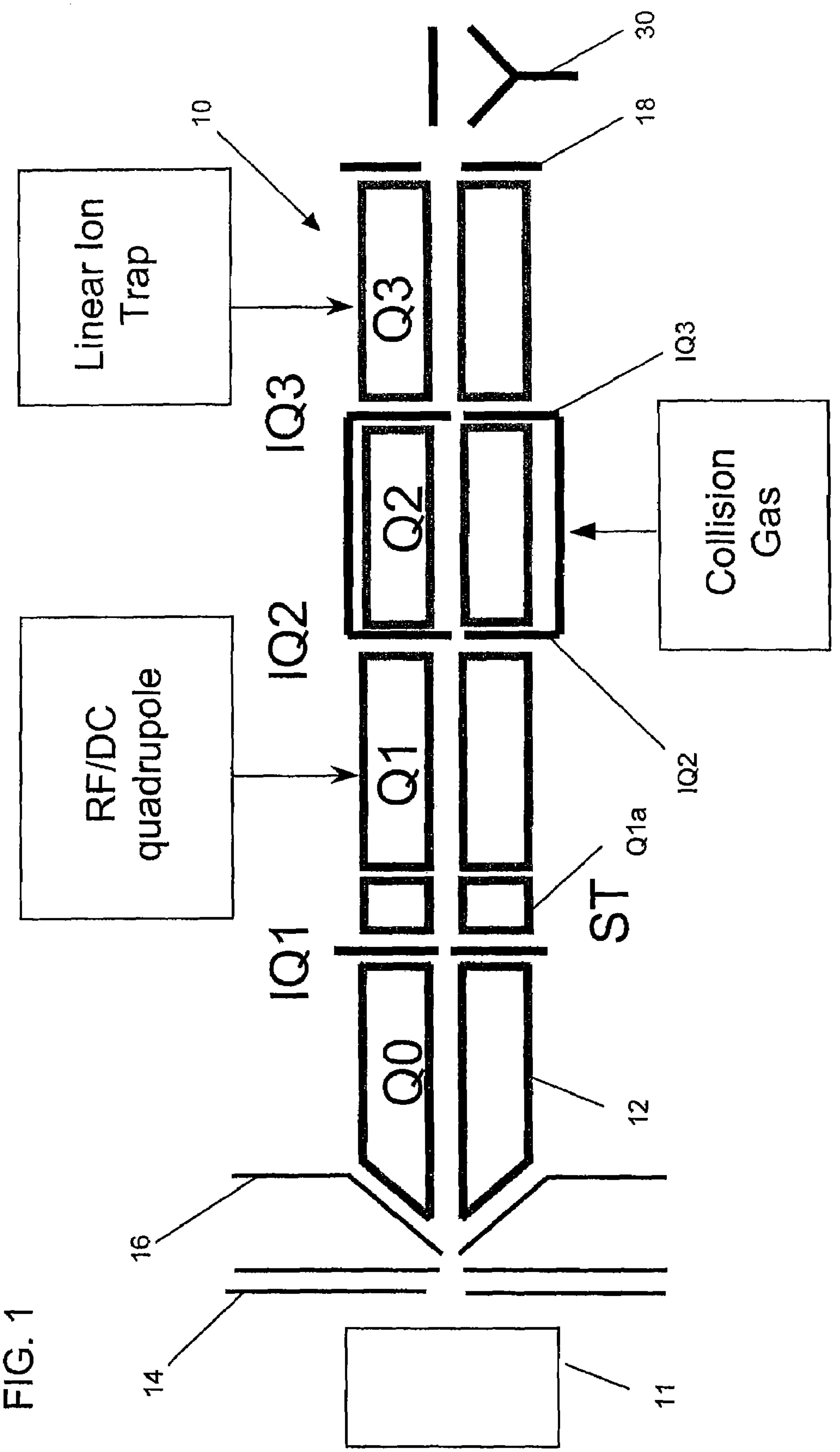
FIG. 1, in a schematic diagram, illustrates a linear ion trap mass spectrometer system that can be operated to implement a method in accordance with an aspect of a first embodiment of the present invention.

Referring to FIG. 1, there is illustrated in a schematic diagram, a linear ion trap mass spectrometer system 10, as described by Hager and LeBlanc in Rapid Communications of Mass Spectrometry System 2003, 17, 1056-1064. During operation of the mass spectrometer system, ions from an ion source 11 can be admitted into a vacuum chamber 12 through an orifice plate 14 and skimmer 16. The linear ion trap mass spectrometer system 10 comprises four elongated sets of rods Q0, Q1, Q2, and Q3, with orifice plates IQ1 after rod set Q0, IQ2 between Q1 and Q2, and IQ3 between Q2 and Q3. An additional set of stubby rods Q1$a$ is provided between orifice plate IQ1 and elongated rod set Q1.

In some cases, fringing fields between neighboring pairs of rod sets may distort the flow of ions. Stubby rods Q1$a$ are provided between orifice plate IQ1 and elongated rod set Q1 to focus the flow of ions into the elongated rod set Q1.

Ions can be collisionally cooled in Q0, which may be maintained at a pressure of approximately $8\times10^{-3}$ torr. Both the transmission mass spectrometer Q1 and the downstream linear ion trap mass spectrometer Q3 are capable of operation as conventional transmission RF/DC multipole mass spectrometers. Q2 is a collision cell in which ions collide with a collision gas to be fragmented into products of lesser mass. Typically, ions may be trapped in the linear ion trap mass spectrometer Q3 using RF voltages applied to the multipole rods, and barrier voltages applied to the end aperture lenses 18. Q3 can operate at pressures of around $3\times10^{-5}$ torr, as well as at other pressures in the range of $10^{-5}$ torr to $10^{-4}$ torr.

Figure 2:
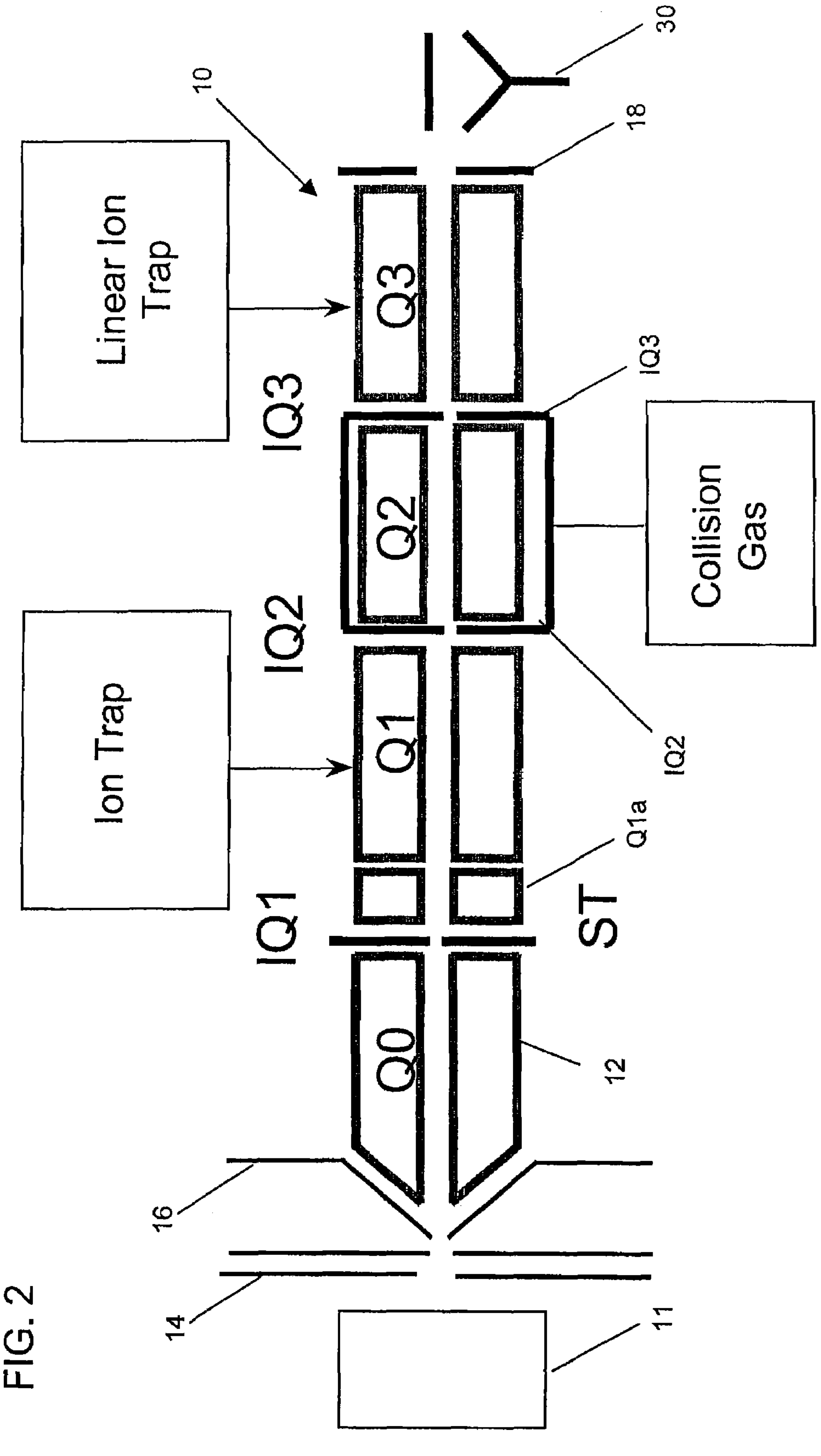
FIG. 2, in a schematic diagram, illustrates a second linear ion trap mass spectrometer system that may be operated to implement a method in accordance with an aspect of a second embodiment of the present invention.

Referring to FIG. 2, there is illustrated in a schematic diagram, an alternative linear ion trap mass spectrometer system 10. For clarity, the same reference numbers as those used in respect of the linear ion trap mass spectrometer system of FIG. 1 are used with respect to the linear ion trap mass spectrometer system of FIG. 2. For brevity the description of FIG. 1 is not repeated with respect to FIG. 2.

The linear ion trap mass spectrometer system 10 of FIG. 2 is similar to that of linear ion trap mass spectrometer system of FIG. 1, except that in the linear ion trap mass spectrometer system 10 of FIG. 2, Q1 is an ion trap instead of being a transmission mass spectrometer. A mode of operation for linear ion trap mass spectrometer system 10 of FIG. 2 in accordance with an aspect of an embodiment of the present invention, is described below.

Figure 3:
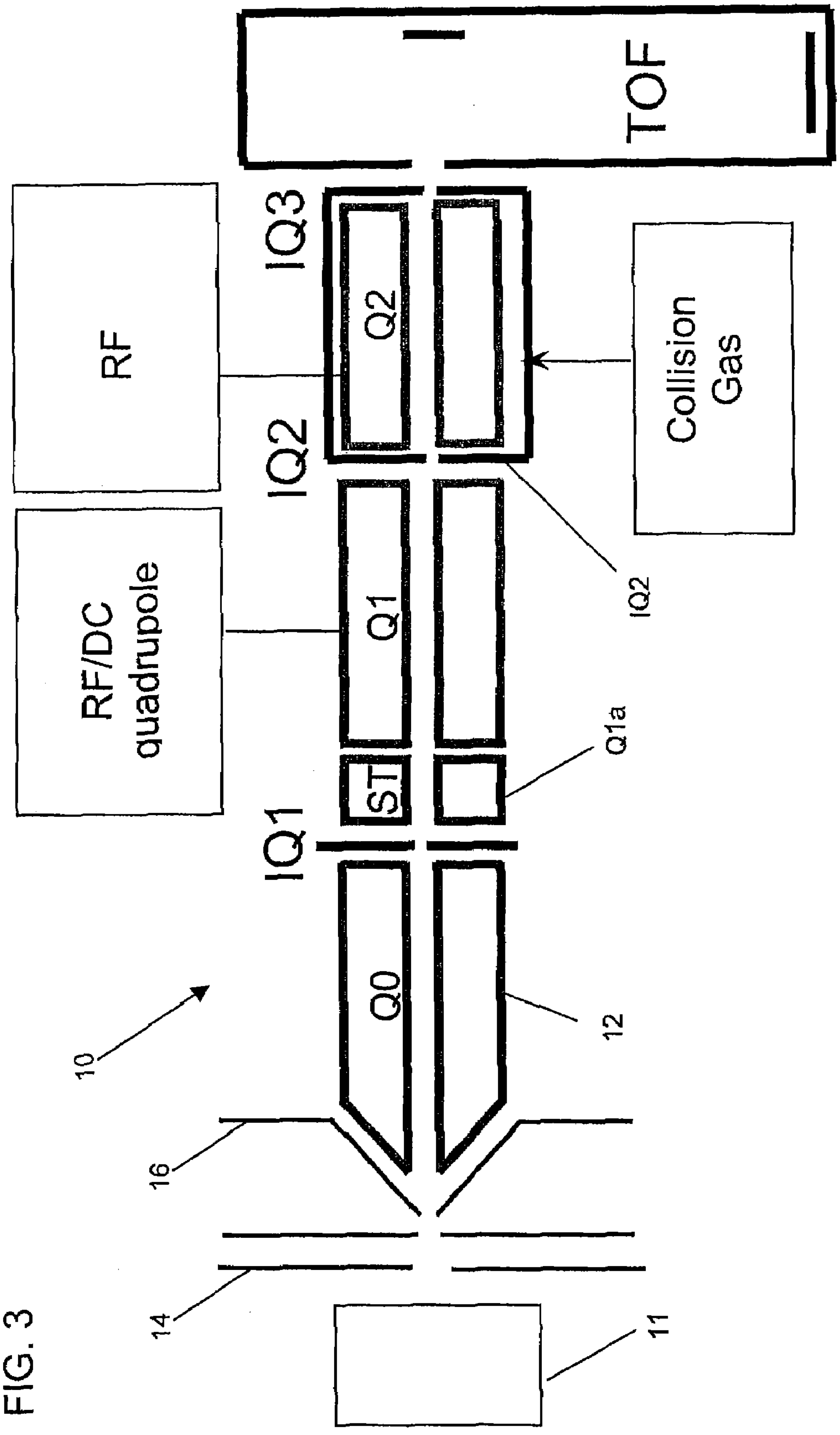
FIG. 3, in a schematic diagram, illustrates a third linear ion trap mass spectrometer system that may be operated to implement a method in accordance with an aspect of a third embodiment of the present invention.

Referring to FIG. 3, a further alternative mass spectrometer system 10 is illustrated in a schematic diagram. For clarity, the same reference numerals as those used in respect of the linear ion trap mass spectrometer system of FIG. 1 are used with respect to a linear ion trap mass spectrometer system of FIG. 3. For brevity, the description of FIG. 1 is not repeated with respect to FIG. 3. This mass spectrometer system 10 of FIG. 3 resembles the mass spectrometer system of FIG. 1, except that Q3 and the detector 30 of FIG. 1 have been replaced with a Time of Flight (TOF) mass spectrometer. As will be described in more detail, the mass spectrometer system 10 of FIG. 3 can also be used to implement a method in accordance with a further aspect of an embodiment of the present invention.

As described above, analysis of complex mixtures using an ion trap mass spectrometer usually involves mass resolution of the target precursor ion, generation of fragment ions, and conducting a mass scan. The time involved with this cycle often means that a limited number of product ion mass spectra can be generated during a liquid chromatographic separation. When the analyte mixture is particularly complex, this limitation can be severe. Several re-injections may then be required.

In accordance with an aspect of an embodiment of the present invention, a method is described below for enhancing the duty cycle of the linear ion trap mass spectrometer system 10 of FIG. 1. This method can involve sequentially filling the ion trap Q3 with product ions from a series of precursor ions followed by a single mass analysis scan step. The resulting spectrum will contain contributions from fragment ions of all of the precursor ions. If particular fragment ions can be mapped back to the precursor ion from which they originated, then the ion trap mass spectrometer system 10 can be operated with higher duty cycles since multiple product ion mass spectra can be generated for each mass scan step of the ion trap.

Normally it would be very difficult to attribute a fragment ion or group of fragment ions to a particular precursor ion when more than one precursor ion has been fragmented. The current method allows information to be encoded for each precursor ion that can also be visible in the fragment ions that arise from that precursor ion. Such precursor ion specific information can be differences in isotope distributions, differences in mass spectral peak widths, differences in ion intensities, and differences in the extent of fragmentation. Other ion specific information may also be encoded. The information may be encoded in the precursor, and then carried over into the fragments, or may be encoded in the fragments directly, using other encoding operations. Each of these encoding operations is considered in turn below.

Isotope Pattern Differences

A linear ion trap mass spectrometer system can mass select and fragment precursor ions prior to admittance into the linear ion trap Q3. For example, ions from the ion source 11 can be mass analyzed by Q1 and fragmented via collisional activation in Q2. The fact that the stream of ions from the ion source 11 can be mass resolved upstream of Q3 means disparate ions can be admitted into Q3 using consecutive "fill" steps simply by changing the settings of the resolving Q1 mass filter for each "fill" step. Furthermore, Q1 can select the precursor ions such that each one has a unique isotopic pattern.

In conventional operation of a linear ion trap mass spectrometer system, precursor ions are selected by Q1 using the same resolving characteristics for each one, often with either "unit" or "open" resolution. When Q1 is operated at "unit" mass resolution the transmitted peak widths are approximately 0.7 amu at half height. When Q1 is operated at "open" resolution, the transmitted window is considerably broader, for example 2-4 amu wide at half height. A Q1 operated at unit mass resolution can often select only a single isotope from the precursor ion isotopic distribution. In contrast, a Q1 operated at open resolution can often allow passage of the entire isotope distribution of the precursor ion.

In accordance with the method according to an aspect of an embodiment of the present invention, precursor ions can be selected such that each one has a unique isotope distribution. Thus, when fragmented, the resulting product ions for each precursor will also have unique isotope distributions. Consider the simple example of selecting only the $^{12}$C isotope for precursor 1 and the $^{12}$C$^{13}$C$^{13}$C isotope for precursor 2. The fragment ions generated from precursor 1 can all be monoisotopic while those generated from precursor 2 can have contributions from fragment ions with no $^{13}$C isotopes, with a single $^{13}$C isotope and fragments with two $^{13}$C isotopes. The relative intensities of the isotopes of the fragments in the product ion spectrum will depend on the m/z of the fragment ion and can be calculated using known techniques.

Figure 4:
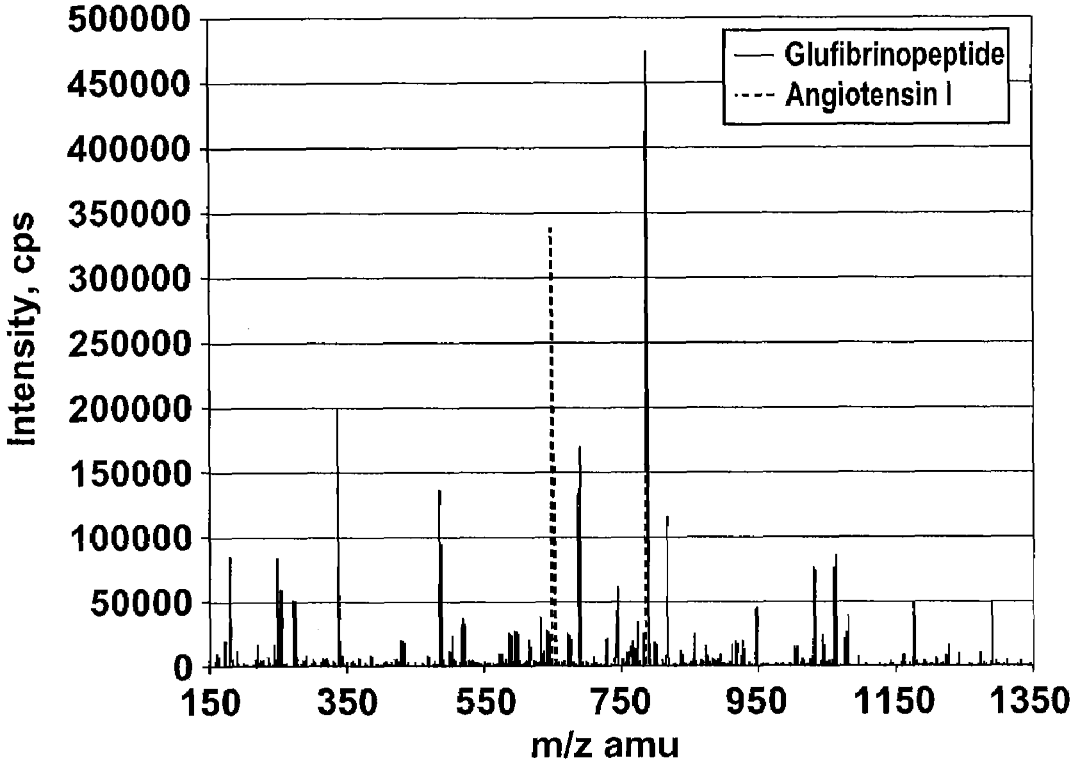
FIG. 4 illustrates a composite product ion spectra of a mixture of two peptides, glu-fibrinopeptide (glu-fib) and angiotensin I (angio) obtained by operating the linear ion trap mass spectrometer system of FIG. 1 in accordance with a first aspect of a first embodiment of the present invention.
Figure 5:
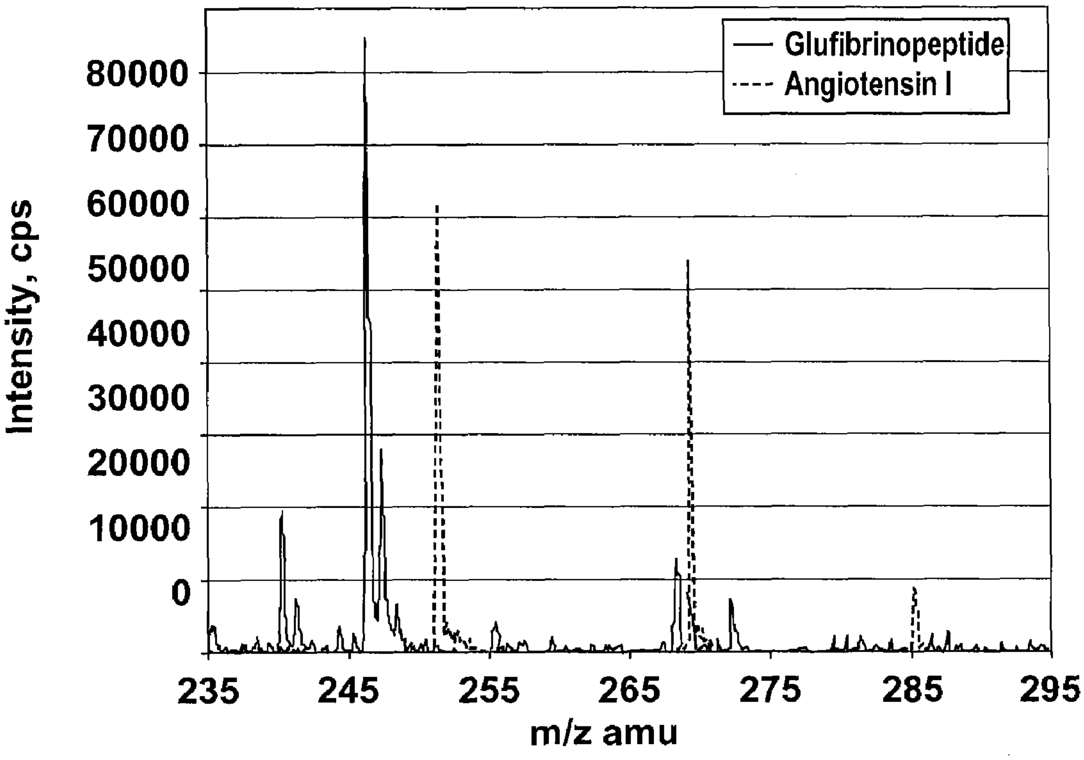
FIG. 5 is a scale-expanded view of a lower mass-range of the composite product ion spectra of FIG. 4.
Figure 6:
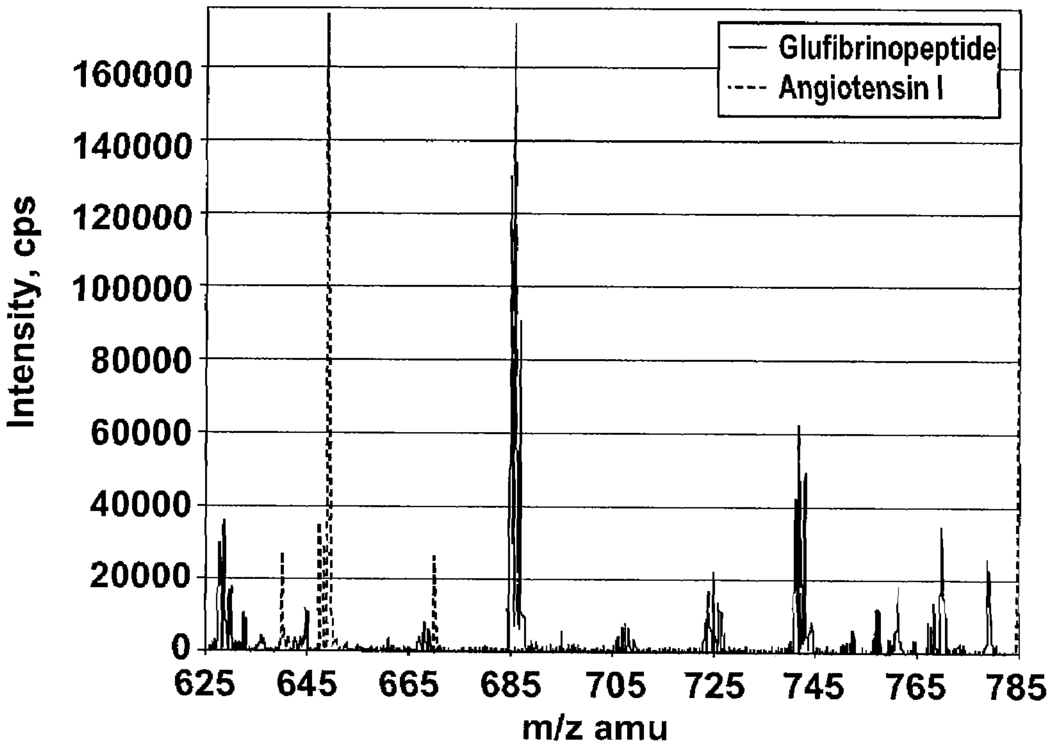
FIG. 6 is a scale-expanded view of an intermediate mass-range of the composite product ion spectra of FIG. 4.
Figure 7:
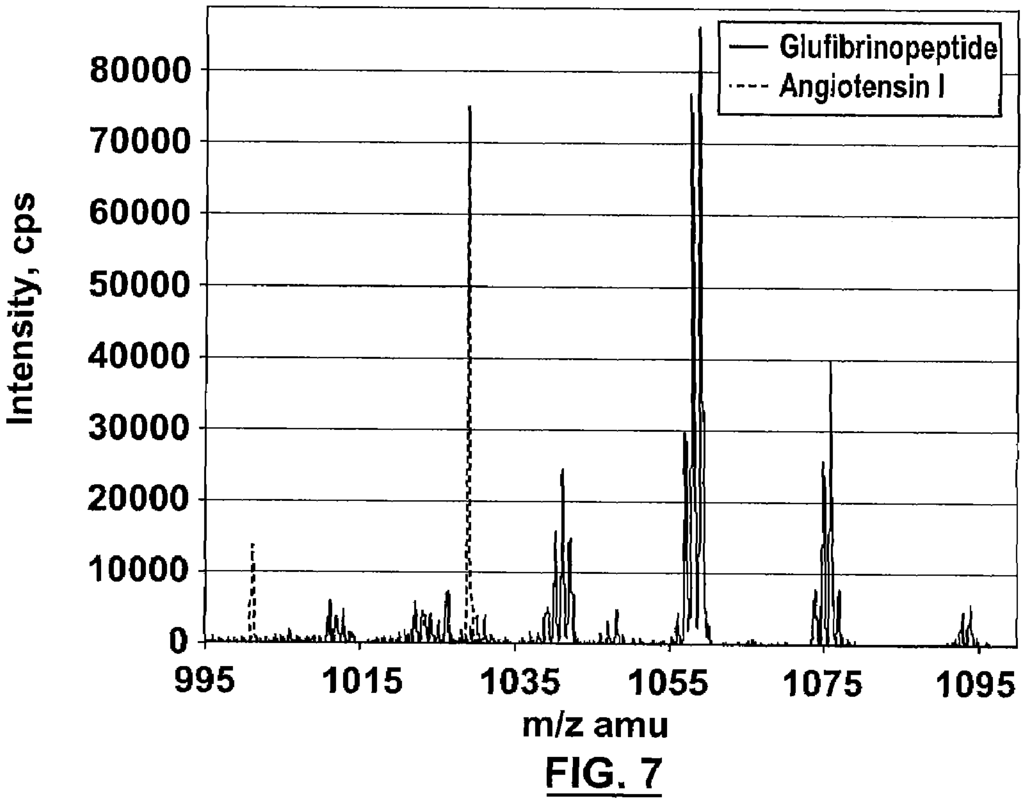
FIG. 7 is a scale-expanded view of a higher mass-range of the composite product ion spectra of FIG. 4.

As a simple example, consider a mixture of two peptides, glu-fibrinopeptide (glu-fib) and angiotensin I (angio) and a 4000QTRAP. The angio precursor ion can be selected by Q1 such that only the $^{12}$C isotope is transmitted. This ion can then be fragmented in Q2 and the product and residual precursor ions trapped in the Q3 LIT. Next, prior to scanning the Q3 LIT, Q1 can select the $^{12}$C$^{13}$C$^{13}$C isotope of glu-fib which can be fragmented in Q2 and the products trapped in the Q3 LIT. After a cooling period, which, depending on the operating pressure of Q3, may be several tens of milliseconds, the Q3 LIT can be scanned to produce a composite product ion mass spectrum consisting of angio and glu-fib fragment ions. A close look at the spectrum shows that the fragment ions can be easily assigned to a precursor ion based on their isotopic distribution. All of the angio fragments can be made monoisotopic, while those from glu-fib can have a unique isotopic distribution based on the precursor isotope selected by Q1 and the fragment m/z. FIG. 4 displays the full range composite mass spectrum. Here, the spectra have been collected individually and coded using dashed and solid lines to enhance visual differentiation. FIGS. 5-7 show mass scale expanded views to better appreciate the effects of precursor ion selection with isotope coding. As is clearly apparent from the mass spectra of FIGS. 5 to 7, the peaks for the fragments of angio, are, as expected, easily distinguished from the peaks for the fragments of glu-fib. Accordingly, it is possible to search the mass spectrum for mass spectral peaks of different isotopic patterns to distinguish the fragments of the different precursors, and to correlate these fragments back to their respective precursors.

These spectra demonstrate that precursor isotope coding can provide enough information to distinguish fragment ions from more than one precursor ion in a single product ion mass spectrum.

In general, precursor ion isotope coding need not be restricted to selection of a single isotope peak of a precursor ion. Techniques can be envisaged by which the precursor ion is encoded such that the $^{12}$C$^{13}$C$^{13}$C isotopes all have the same intensities or even one in which the precursor isotope pattern prior to fragmentation is missing a particular isotope, e.g. $^{12}$C\_$^{13}$C, in which the first $^{13}$C isotope has been omitted from the isotope cluster sent downstream for fragmentation. A series of possible precursor ion isotope encodings is illustrated below.

Examples of Precursor Ion Isotope Encoding Schemes

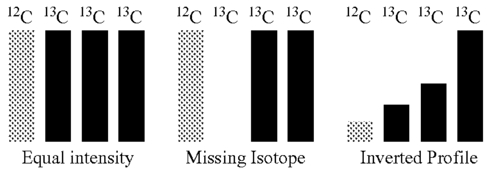

This technique can be applied to other ion trap mass spectrometers, even those without mass selection and fragmentation prior to the ion trap. For in-trap precursor ion selection and fragmentation, tailored waveforms could be used for both the precursor isotope coding and the fragmentation. This type of isotopic encoding can be employed to particular advantage where fragments of more than two precursors are being analyzed. For example, using the above-described isotopic encoding techniques, as many as three, or four, or even more precursors may be separately encoded with different isotopic distributions, such that their respective fragments will be distinguishable from each other, and can be correlated back to the precursors from which they stem. As a result, the fragments of the different precursors can be ejected or scanned from the Q3 LIT during the same time interval, or at least during time intervals that overlap, such that the scan times for the different fragments can be largely concurrent instead of being consecutive.

An approach is described next for the case in which the isotope coding is accomplished using a standard RF/DC quadrupole. The isotopic contributions for an arbitrary compound can be calculated as is well-known (see, F. W. McLafferty and F. Turecek, Interpretation of Mass Spectra, Fourth Edition, University Science Books, Sausalito Calif. 1993, Chapter 2). If, for example, the analyte of interest is composed of only carbon and hydrogen and has a total of 60 carbon atoms, then the resulting isotopic cluster of the (M+H) ion will have the following intensity pattern, which can be calculated. The $^{12}C$ isotope will have intensity of 1, the first $^{13}C$ isotope an intensity of 0.66, and the second $^{13}C$ isotope an intensity of 0.21. In order to generate an encoded isotopic cluster with relative intensities of 1:1:1, the ion trap needs to filled with each of the individual isotopes (at unit resolution) at relative fill times of 1 1/0.66 and 1/0.21. Of course, filling the ion trap with some of the less intense isotopes can take more time, especially when using an RF/DC quadrupole mass filter. The original isotope distribution of the precursor ions can be determined at the outset using a single MS survey scan.

For example, the linear ion trap mass spectrometer system 10 of FIG. 1 can select, in accordance with a further aspect of this embodiment of the present invention, say four precursor ions such that each one has a unique isotope distribution as described above. For example, consider a mixture of four precursors, A, B, C and D. The ions of A can be selected by Q1 of FIG. 1 such that only the $^{12}C$ isotope is transmitted. This ion can then be fragmented in Q2 and the product and residual precursor ions trapped in Q3 LIT. Next, prior to scanning the Q3 LIT, Q1 can select a different isotopic pattern for precursor B. For example, Q1 can operate for different periods of time at unit resolution to transmit each of, say, two individual isotopes such that relative intensities of the two different isotopes is 1:1, in a manner similar to that described above based on an initial known isotope distribution. The precursor B ions according to this second isotope distribution can then be fragmented in Q2 and the product and residual precursor ions trapped in Q3 LIT, together with the product and residual precursor ions of A.

Next, prior to scanning the Q3 LIT, Q1 can be operated to select an isotopic pattern for precursor C that differs from the isotopic patterns for precursors A and B. For example, Q1 can operate for different periods of time at unit resolution to transmit each of three individual isotopes such that relative intensities of the three different isotopes is 1:1:1 by varying the fill times in a manner similar to that described above in connection with precursor B. Then, these ions of precursor C encoding a third isotopic pattern can be fragmented in Q2 and trapped together with the fragments of A and B in Q3 LIT.

Finally, Q1 can be operated to select an isotopic pattern for precursor D that differs from the isotopic patterns for precursors A, B and C. That is, Q1 can be operated for different periods of time at unit resolution to transmit each of two individual isotopes such that relative intensities of the two different isotopes, as well an intermediate isotope, is 1:0:1. The intermediate isotope represented in this distribution is filtered out by Q1 and thus would be almost entirely missing from the ions of precursor D transmitted to Q2. Then these ions of precursor D could be fragmented in Q2 and the resulting fragments trapped in Q3 LIT.

After a cooling period, Q3 LIT can be scanned to produce a composite product ion mass spectra consisting of the products (fragments) of A, B, C and D. The peaks for each of these fragments will have different patterns depending on the particular isotopic distribution encoded into its respective precursor. That is, the peaks representing the fragments of precursor A would comprise only a single spike in intensity as only a single isotope was transmitted from Q1. The peaks of the fragments of B would comprise two closely spaced spikes of approximately the same height representing the 1:1 isotopic distribution.

In similar manner, the peaks of the fragments of precursor C could be distinguished from the peaks of fragments of precursors A and B as the peaks of the fragments of precursor C would comprise three closely spaced spikes of approximately the same height representing the 1:1:1 isotopic distribution. Finally, the peaks representing the fragments of precursor D would comprise two less closely spaced spikes of approximately the same height representing the 1:0:1 isotopic distribution, where the gap represents the missing isotope filtered out by Q1.

When, as described below in more detail the precursor ion selection is carried out by an ion trap or ion guide, a tailored waveform (notched broadband AC field) can be generated such that the precursor ion selecting device biases the precursor ion population toward the lesser abundant isotopes. Since these waveforms can be constructed mathematically, this approach can yield many different recognizable precursor ion isotope patterns.

This mode of operation can be implemented using the linear ion trap mass spectrometer system 10 of FIG. 2. For example, a first precursor ion could be supplied to the ion trap Q1. At that point, a notched broadband AC field could be generated and applied to the first precursor ions trapped in Q1. The notch in the notched broadband AC field could be selected to be narrow enough to filter out several of the isotopes of the first precursor ions. If this notch were made sufficiently narrow, then the first precursor ions remaining in the Q1 would be mono-isotopic. After this notched waveform has been applied, the first precursor ions could be transmitted to the collision cell Q2 for fragmentation. Fragments from the first precursor ion could then be transmitted to the linear ion trap and stored.

After the first precursor ions have been transmitted from Q1, second precursor ions could be admitted. Either a different notched waveform, or no waveform at all, could then be applied to the second precursors within Q1. If a different notched waveform were to be applied to the second precursor ions, then the notch of the second notched waveform would be selected to filter out different isotopes then those filtered out by the first notched waveform applied to the first precursor ions. As a result, the isotopic distribution of the first precursor ions and the second precursor ions would differ. Then, as with the first precursor ions, the second precursor ions could be transmitted to Q2 for fragmentation, the fragments of the second precursor ions subsequently being transmitted to Q3. The fragments of both the first precursor ions and the second precursor ions could then be ejected together from Q3 to generate a mass spectra, where the difference in the isotopic distributions of the fragments of the first precursor ions on the one hand, and the fragments of the second precursor ions on the other hand, could be used to correlate these fragments with their respective precursors, and to distinguish these fragments from each other.

An alternative approach can be taken using a stand-alone ion trap mass spectrometer using tailored waveforms. In this case, a group of similar of disparate ions from the ion source are transmitted to the ion trap mass spectrometer and thermalized. Next, an appropriately constructed waveform is used to simultaneously (or nearly so) isolate the desired precursor ion isotopic distributions of the analytes of interest. Sometime after isolation, a different tailored waveform can be used to simultaneously (or nearly so) excite the trapped, encoded precursor ions to form encoded fragment ions. The encoded fragment ions would then be ejected and detected using conventional techniques.

Turning to FIG. 3, the mode of operation of this mass spectrometer system 10 is quite similar to that of the mode of operation of the linear ion trap mass spectrometer system 10 of FIG. 1. However, in the mass spectrometer system 10 of FIG. 3, Q2 functions both as a collision cell and as a linear ion trap, such that the fragments of all of the precursor ions being analyzed are stored in Q2, before being transmitted out of Q2 into the TOF mass spectrometer for detection.

Duty Cycle Gains

The duty cycle gains can be estimated by comparing the time required to acquire multiple product ion mass spectra with the time required to acquire mass spectra for a single composite spectrum with precursor isotope coding. If one assumes a 10 ms fill time and a Q3 LIT which scans a 1500 amu mass range at 1000 amu/sec or 10,000 amu/sec, the results in Table 1 can be obtained. At either scan speed the effect of using the composite product ion generation and decoding approach can be to approximately enhance the duty cycle by about 1.8× for the analysis of two analytes, by >2.6× for the analysis of three analytes, by >3.5× for the analysis of four analytes. The effect of a scan speed or rate increase of 10× from 1000 amu/sec to 10,000 amu/sec does not significantly dilute the duty cycle enhancements from analysis of composite product ion mass spectra based on encoded precursor ions. The gain from ejecting the fragments from the Q3 LIT substantially contemporaneously increases with the number of analytes.

TABLE 1

| | 1 Traditional Cycle | 2 Traditional Cycles | 3 Traditional Cycles | 4 Traditional Cycles | 2 Analyte Composite Cycle | 3 Analyte Composite Cycle | 4 Analyte Composite Cycle |
|---|---|---|---|---|---|---|---|
| At 1000 amu/sec | | | | | | | |
| Fill Time (ms) | 10 | 20 | 30 | 40 | 20 | 30 | 40 |
| Cool Time (ms) | 75 | 150 | 225 | 300 | 75 | 75 | 75 |
| Scan Time (ms) | 1500 | 3000 | 4500 | 6000 | 1500 | 1500 | 1500 |
| Overhead Time (ms) | 10 | 20 | 30 | 40 | 10 | 10 | 10 |
| Total (ms) | 1595 | 3190 | 4785 | 6380 | 1605 | 1615 | 1625 |
| Duty Cycle Gain | | | | | 1.99X | 2.96X | 3.93X |
| At 10,000 amu/sec | | | | | | | |
| Fill Time (ms) | 10 | 20 | 30 | 40 | 20 | 30 | 40 |
| Cool Time (ms) | 75 | 150 | 225 | 300 | 75 | 75 | 75 |
| Scan Time (ms) | 150 | 300 | 450 | 600 | 150 | 150 | 150 |
| Overhead Time (ms) | 10 | 20 | 30 | 40 | 10 | 10 | 10 |
| Total (ms) | 245 | 490 | 735 | 980 | 255 | 265 | 275 |
| Duty Cycle Gain | | | | | 1.92X | 2.77X | 3.56X |

Table 1 shows the calculated cycle times required to carry out product ion scans at two different RF voltage scan speeds. The traditional cycle is for sequential fill, cool, scan step for each analyte. The composite cycle is for filling the ion trap with the products of multiple encoded precursor ions followed by a cool step, then a scan step. A fill time of 10 ms/analyte has been assumed. As can be seen from Table 1, the gains in duty cycle increase with the number of analytes. For example, in the two analyte case, the scan time for the composite cycle is well under two thirds of the scan time using the traditional cycle. In the three analyte case, the composite cycle scan time is well under one half of the aggregate scan time required to separately scan the three different sets of fragments according to the traditional cycle. In the four analyte case, the scan time for the composite cycle is well under a third of the aggregate scan time required to separately scan the four different sets of fragment ions according to the traditional cycle.

Other Techniques for Encoding

There are other techniques for encoding precursor ion information into the resulting fragment ions. One way to distinguish one set of fragment ions from another is by differences in mass spectral peak widths. A technique to encode one set of fragment ions with peak widths different from another is to allow for different cooling times after admittance into the ion trap. Consider a scan function in which the set of fragment ions from the first precursor ions are admitted into the Q3 LIT and cooled for about 50 ms. Next the fragment ions from the second precursor ion are admitted into the Q3 LIT and all ions are scanned out immediately, such that the most recently added ions to the ion trap do not have enough time to cool, even during the scanning process. The resulting composite product ion mass spectrum will have ions with a mixture of narrow and wide peaks. The fragment ions that have cooled, that is those admitted from the first precursor ion, will have narrower peak widths than those admitted second, since these subsequently admitted fragment ions will not have cooled sufficiently. In this case, one could select the $^{12}C$ isotope from both precursor ions at a high resolution using a narrow transmission window (as described above) so that all of the fragment ions are mono-isotopic. This could make it easier to discern any peak width differences.

TABLE 2

| | At 50,000 amu/sec | | |
|---|---|---|---|
| | 1 Traditional Cycle | 2 Traditional Cycles | 2 Analyte Composite Cycle |
| Fill Time (ms) | 10 | 20 | 20 |
| Cool Time (ms) | 75 | 150 | 75 |
| Scan Time (ms) | 30 | 60 | 30 |
| Overhead Time (ms) | 10 | 20 | 10 |
| Total (ms) | 125 | 250 | 135 |
| Duty Cycle Gain | | | 1.85X |

Table 2 tabulates calculated cycle times required to carry out product ion scans under the standard approach and one in which the ions have been encoded with different peak widths using differential cooling. The scan range has been assumed to be 1500 amu and the fill time is 10 ms. The composite method involves filling the ion trap with the first analyte, followed by a cool period of 75 ms, followed by a 10 ms fill step for the second analyte, immediately followed by a rapid mass scan (50,000 amu/sec in 30 ms).

In accordance with other aspects of this method, the cooling time, during which the fragment ions of one precursor are cooled can be as little as 40 milliseconds, while a minimal time period, during which other fragment ions are cooled, can be less than 10 milliseconds. Of course, appropriate cooling times will vary depending on the pressures at which the linear ion trap operate, which pressures can vary from linear ion trap to linear ion trap. One possible rule of thumb is that the cooling time period should be at least four times as long as the minimal time period mentioned above.

Other techniques of encoding fragment ions with information about the precursor ion from which they originated include differences in relative intensity and the extent of fragmentation. Differences in relative intensity can be encoded by simply filling the ion trap with many more fragments of one precursor than the other. Of course, care will have to be taken when this method is implemented, as there is a risk that the low intensity fragments will simply be swamped by the high intensity fragments. Differences in the degree of fragmentation can also provide a way of encoding precursor information onto a set of fragment ions. According to this approach, one of the precursor ions is fragmented at relatively high energy and the other at relatively low energy. This approach may be useful if there are significant low energy fragmentation pathways available with simple neutral losses.

Other variations and modifications of the invention are possible. For example, it will be realized that this method (particularly precursor ion isotope encoding) can also be applied to instruments other than those described above. Although the foregoing description refers to linear ion traps, it will be appreciated that the ion traps used to implement some aspects of some embodiments of the invention need not be linear ion traps. For example, a conventional spherical ion trap might be used. Ion traps having other geometries can also be used. All such modifications and variations are believed to be within the sphere and scope of the invention as defined by the claims.

The invention claimed is:

1. A method of operating a mass spectrometer system having an ion trap, the method comprising:

a) processing a first group of precursor ions to obtain a first plurality of fragment ions trapped in the ion trap;

b) applying a first encoding operation for encoding a first selected characteristic in at least one of the first group of precursor ions and the first plurality of fragments, wherein the first encoding operation is applied to the at least one of the first group of precursor ions and the first plurality of fragments without being applied to other ions such that the first plurality of fragment ions has the first selected characteristic and the other ions lack the first selected characteristic;

c) ejecting the first plurality of fragment ions and the other ions out of the ion trap;

d) detecting the first plurality of fragment ions and the other ions;

e) based on the first selected characteristic, correlating the first plurality of fragment ions detected with the first group of precursor ions to distinguish the first plurality of fragment ions from the other ions detected.

2. The method as defined in claim 1 wherein a) further comprises processing a second group of precursor ions to obtain a second plurality of fragment ions trapped in the ion trap with the first plurality of fragment ions;

b) further comprises applying a second encoding operation for encoding a second selected characteristic in at least one of the second group of precursor ions and the second plurality of fragments, wherein the second encoding operation is applied to the at least one of the second group of precursor ions and the second plurality of fragments without being applied to ions other than the second group of precursor ions and the second plurality of fragment ions such that the second plurality of fragment ions has the second selected characteristic and fragment ions other than the second plurality of fragment ions lack the second selected characteristic;

c) comprises ejecting the second plurality of fragment ions and the fragment ions other than the second plurality of fragment ions out of the ion trap;

d) comprises detecting the second plurality of fragment ions and the fragment ions other than the second plurality of fragment ions; and e) further comprises, based on the second selected characteristic, correlating the second plurality of fragment ions detected with the second group of precursor ions to distinguish the second plurality of fragment ions from the fragment ions other than the second plurality of fragment ions detected.

3. The method as defined in claim 2 wherein ejecting the second plurality of fragment ions out of the ion trap substantially overlaps in time ejecting the first plurality of fragment ions out of the ion trap.

4. The method as defined in claim 3 wherein c) occurs during a scan time at a scan rate; and, the scan time is less than two thirds of an aggregate scan time required to separately scan the first plurality of fragment ions and the second plurality of fragment ions out of the ion trap at the scan rate.

5. The method as defined in claim 2 wherein a) further comprises processing a third group of precursor ions to obtain a third plurality of fragment ions trapped in the ion trap with the first plurality of fragment ions and the second plurality of fragment ions;

b) further comprises applying a third encoding operation for encoding a third selected characteristic in at least one of the third group of precursor ions and the third plurality of fragments, wherein the third encoding operation is applied to the at least one of the third group of precursor ions and the third plurality of fragments without being applied to ions other than the third group of precursor ions and the third plurality of fragments such that the third plurality of fragment ions has the third selected characteristic and fragment ions other than the third plurality of fragment ions lack the third selected characteristic;

c) comprises ejecting the third plurality of fragment ions and the fragment ions other than the third plurality of fragment ions out of the ion trap;

d) comprises detecting the third plurality of fragments and the fragment ions other than the third plurality of fragment ions; and, e) based on the third selected characteristic, correlating the third plurality of fragment ions detected with the third group of precursor ions to distinguish the third plurality of fragment ions from the fragment ions other than the third plurality of fragment ions detected.

6. The method as defined in claim 5 wherein c) comprises ejecting the first plurality of fragment ions, the second plurality of fragment ions and the third plurality of fragment ions out of the ion trap substantially contemporaneously.

7. The method as defined in claim 6 wherein c) occurs during a scan time at a scan rate; and, the scan time is less than half of an aggregate scan time required to separately scan the first plurality of fragment ions, the second plurality of fragment ions and the third plurality of fragment ions out of the ion trap at the scan rate.

8. The method as defined in claim 5 wherein a) further comprises processing iii) a fourth group of precursor ions to obtain a fourth plurality of fragment ions trapped in the ion trap with the first plurality of fragment ions, the second plurality of fragment ions and the third plurality of fragment ions;

b) further comprises applying a fourth encoding operation for encoding a fourth selected characteristic in at least one of the fourth group of precursor ions and the fourth plurality of fragments, wherein the fourth encoding operation is applied to the at least one of the fourth group of precursor ions and the fourth plurality of fragments without being applied to ions other than the fourth group of precursor ions and the fourth plurality of fragments such that the fourth plurality of fragment ions has the fourth selected characteristic and fragment ions other than the fourth plurality of fragment ions lack the fourth selected characteristic;

c) comprises ejecting the fourth plurality of fragment ions and the fragment ions other than the fourth plurality of fragment ions out of the ion trap;

d) comprises detecting the fourth plurality of fragments and the fragment ions other than the fourth plurality of fragment ions; and, e) based on the fourth selected characteristic, correlating the fourth plurality of fragment ions detected with the fourth group of precursor ions to distinguish the fourth plurality of fragment ions from the other ions detected.

9. The method as defined in claim 8 wherein c) comprises ejecting the first plurality of fragment ions, the second plurality of fragment ions, the third plurality of fragment ions and the fourth plurality of fragment ions out of the ion trap substantially contemporaneously.

10. The method as defined in claim 9 wherein c) occurs during a scan time at a scan rate; and, the scan time is less than a third of an aggregate scan time required to separately scan the first plurality of fragment ions, the second plurality of fragment ions, the third plurality of fragment ions and the fourth plurality of fragment ions out of the ion trap at the scan rate.

11. The method as defined in claim 2 wherein the first selected characteristic is a first isotopic pattern;

the second selected characteristic is a second isotopic pattern different from the first isotopic pattern;

d) comprises providing a mass spectrum based on the ions detected;

e) comprises i) searching the mass spectrum for mass spectral peaks of the first isotopic pattern to distinguish the first plurality of fragments, and ii) searching the mass spectrum for mass spectral peaks of the second isotopic pattern to distinguish the second plurality of fragments.

12. The method as defined in claim 11 wherein each of the first group of precursor ions and the second group of precursor ions begin with an initial distribution of a plurality of isotopes;

the first encoding operation comprises processing the first group of precursor ions to provide the first isotopic pattern as a first distribution of the plurality of isotopes; and the second encoding operation comprises processing the second group of precursor ions to provide the second isotopic pattern as a second distribution of the plurality of isotopes, the second distribution of the plurality of isotopes being different from the first distribution of the plurality of isotopes.

13. The method as defined in claim 11 wherein the first encoding operation comprises mass selecting the first group of precursor ions at a high resolution using a narrow transmission window to filter out isotopes of the first group of precursor ions to provide the first isotopic pattern;

the second encoding operation comprises mass selecting the second group of precursor ions at a low resolution using a wide transmission window to retain isotopes of the second group of precursor ions to provide the second isotopic pattern; and, the wide transmission window is wider than the narrow transmission window.

14. The method as defined in claim 12 wherein the first encoding operation comprises applying a first notched waveform having a narrow notch to the first group of precursor ions to filter out isotopes of the first group of precursor ions to provide the first isotopic pattern;

the second encoding operation comprises applying a second notched waveform having a wide notch to the second group of precursor ions to retain isotopes of the second group of precursor ions to provide the second isotopic pattern; and, the wide notch is wider than the narrow notch.

15. The method as defined in claim 2 wherein the first selected characteristic is a first isotopic pattern;

the second selected characteristic is a second isotopic pattern different from the first isotopic pattern;

the third selected characteristic is a third isotopic pattern different from the first isotopic pattern and the second selected characteristic;

d) comprises providing a mass spectrum based on the ions detected;

e) comprises i) searching the mass spectrum for mass spectral peaks of the first isotopic pattern to distinguish the first plurality of fragments, ii) searching the mass spectrum for mass spectral peaks of the second isotopic pattern to distinguish the second plurality of fragments, and iii) searching the mass spectrum for mass spectral peaks of the third isotopic pattern to distinguish the third plurality of fragments.

16. The method as defined in claim 15 wherein each of the first group of precursor ions, the second group of precursor ions and the third group of precursor ions comprise an initial distribution of a plurality of isotopes;

the first encoding operation comprises processing the first group of precursor ions to provide the first isotopic pattern as a first distribution of the plurality of isotopes;

the second encoding operation comprises processing the second group of precursor ions to provide the second isotopic pattern as a second distribution of the plurality of isotopes, the second distribution of the plurality of isotopes being different from the first distribution of the plurality of isotopes; and the third encoding operation comprises processing the third group of precursor ions to provide the third isotopic pattern as a third distribution of the plurality of isotopes, the third distribution of the plurality of isotopes being different from the first distribution of the plurality of isotopes and the second distribution of the plurality of isotopes.

17. The method as defined in claim 2 wherein a) further comprises trapping the first plurality of fragment ions in the ion trap before admitting the second plurality of fragment ions to the ion trap;

the first encoding operation comprises cooling the first plurality of fragment ions in the ion trap for a cooling period before admitting the second plurality of fragment ions to the ion trap;

the second encoding operation comprises ejecting the first plurality of fragment ions and the second plurality of fragment ions out of the ion trap before substantial cooling of the second plurality of fragment ions occurs;

d) comprises providing a mass spectrum based on the ions detected;

e) comprises i) searching the mass spectrum for mass spectral peaks of the first selected characteristic to distinguish the first plurality of fragment ions from the second plurality of fragment ions, wherein the first selected characteristic comprises the mass spectral peaks of the first plurality of fragment ions being substantially narrower than mass spectral peaks of the second plurality of fragment ions detected.

18. The method as defined in claim 17 wherein c) further comprises ejecting the first plurality of fragment ions and the second plurality of fragment ions out of the ion trap within a minimal period after the second plurality of fragment ions are admitted to the cooling trap; and the method further comprises selecting the cooling period and the minimal period such that the mass spectral peaks of the first plurality of fragment ions are substantially narrower than, to be distinguishable from, the mass spectral peaks of the second plurality of fragment ions detected.

19. The method as defined in claim 18 wherein the cooling period is at least 40 ms and the minimal period is less than 10 ms.

20. The method as defined in claim 18 wherein the cooling period is at least four times as long as the minimal period.

21. The method as defined in claim 17 wherein a) further comprises i) mass selectively transmitting the first group of precursor ions for fragmentation to generate the first plurality of fragment ions trapped in the ion trap, and ii) mass selectively transmitting the second group of precursor ions for fragmentation to generate the second plurality of fragment ions trapped in the ion trap.

22. The method as defined in claim 21 further comprising mass selecting the first group of precursor ions and the second group of precursor ions at a high resolution using a narrow transmission window to filter out isotopes to provide a narrower range of isotopes to narrow both the mass spectral peaks of the first plurality of fragment ions and the mass spectral peaks of the second group of precursor ions detected.

23. The method as defined in claim 1 wherein the ion trap is a linear ion trap.

* * * * *